United States Patent
Decesaris et al.

(10) Patent No.: US 8,832,343 B2
(45) Date of Patent: Sep. 9, 2014

(54) DOUBLE DENSITY I2C SYSTEM

(75) Inventors: Michael Decesaris, Carrboro, NC (US);
Jeffrey M. Franke, Apex, NC (US);
Luke D. Remis, Raleigh, NC (US); John K. Whetzel, Holly Springs, NC (US)

(73) Assignee: International Business Machines Corporation, Armonk, NY (US)

(*) Notice: Subject to any disclaimer, the term of this patent is extended or adjusted under 35 U.S.C. 154(b) by 230 days.

(21) Appl. No.: 13/550,715

(22) Filed: Jul. 17, 2012

(65) Prior Publication Data
US 2014/0025851 A1    Jan. 23, 2014

(51) Int. Cl.
G06F 13/00 (2006.01)
G06F 13/38 (2006.01)
G06F 13/42 (2006.01)

(52) U.S. Cl.
CPC .......... G06F 13/385 (2013.01); *G06F 13/4282* (2013.01)
USPC ............. 710/110; 710/2; 710/38; 710/104; 710/300; 710/316

(58) Field of Classification Search
CPC ............ G06F 13/4063; G06F 13/4282; G06F 13/385; G06F 13/4022
USPC ............. 710/110, 2, 38, 104, 300, 316
See application file for complete search history.

(56) References Cited

U.S. PATENT DOCUMENTS

| | | | |
|---|---|---|---|
| 5,376,928 A | 12/1994 | Testin | |
| 5,812,796 A | 9/1998 | Broedner et al. | |
| 6,233,635 B1 * | 5/2001 | Son | 710/315 |
| 6,339,806 B1 * | 1/2002 | Foster et al. | 710/313 |
| 6,874,050 B2 * | 3/2005 | Tangen | 710/300 |
| 7,284,079 B2 * | 10/2007 | Ervin | 710/110 |
| 7,444,453 B2 * | 10/2008 | Ellison | 710/311 |
| 7,689,756 B2 * | 3/2010 | Ellison | 710/311 |
| 7,793,022 B2 | 9/2010 | Travers et al. | |
| 7,814,255 B1 | 10/2010 | Deva et al. | |
| 7,836,223 B2 | 11/2010 | Butcher | |
| 7,840,734 B2 | 11/2010 | Murfett et al. | |
| 7,849,244 B2 * | 12/2010 | Huang et al. | 710/110 |
| 8,667,204 B2 * | 3/2014 | Fischer et al. | 710/305 |
| 2003/0135679 A1 * | 7/2003 | Tangen | 710/300 |

(Continued)

OTHER PUBLICATIONS

Anon., "Method for Bi-Directional Communication Using I2C Buses," IPCOM000209388D, Aug. 2, 2011, pp. 1-5.

*Primary Examiner* — Ryan Stiglic
(74) *Attorney, Agent, or Firm* — Law Office of Jim Boice (57) ABSTRACT

An I2C system comprises an inter-integrated circuit (I2C) master device coupled to an I2C multiplexer via a master I2C bus. A plurality of slave I2C busses emanating from the I2C multiplexer couple the I2C multiplexer to a plurality of I2C slave devices. Each of the slave I2C busses comprises a serial data (SDA) line and serial clock (SCL) line. Each of the slave I2C busses, which is coupled to two I2C slave devices, has a first channel and a second channel. The first channel puts bidirectional serial data on the SDA line and clock signals on the SCL line, and the second channel puts bidirectional serial data on the SCL line and clock signals on the SDA line. A channel selector, associated with the I2C multiplexer, selectively couples the I2C master device to one of the two I2C slave devices via the first channel or the second channel.

15 Claims, 7 Drawing Sheets

(56) References Cited

U.S. PATENT DOCUMENTS

| | | | |
|---|---|---|---|
| 2004/0225812 A1* | 11/2004 | Ervin | 710/305 |
| 2004/0225813 A1* | 11/2004 | Ervin | 710/305 |
| 2008/0250175 A1 | 10/2008 | Sheafor et al. | |
| 2008/0256276 A1* | 10/2008 | Ellison | 710/106 |
| 2008/0288684 A1* | 11/2008 | Ellison | 710/106 |
| 2009/0234999 A1* | 9/2009 | Huang et al. | 710/110 |
| 2011/0320853 A1 | 12/2011 | Maruko | |
| 2012/0191889 A1* | 7/2012 | Fischer et al. | 710/110 |

\* cited by examiner

| BUS 3 ENABLE | BUS 2 ENABLE | BUS 1 ENABLE | BUS 0 ENABLE | C3 / C#3 | C2 / C#2 | C1 / C#1 | C0 / C#0 | COMMAND |
|---|---|---|---|---|---|---|---|---|
| X | X | X | 0 | X | X | X | X | CHANNEL 0/ #0 DISABLED |
| X | X | X | 1 | X | X | X | 1 | CHANNEL 0 SELECTED |
| X | X | X | 1 | X | X | X | 0 | CHANNEL #0 SELECTED |
| X | X | 0 | X | X | X | X | X | CHANNEL 1 / #1 DISABLED |
| X | X | 1 | X | X | X | 1 | X | CHANNEL 1 SELECTED |
| X | X | 1 | X | X | X | 0 | X | CHANNEL #1 SELECTED |
| X | 0 | X | X | X | X | X | X | CHANNEL 2 / #2 DISABLED |
| X | 1 | X | X | X | 1 | X | X | CHANNEL 2 SELECTED |
| X | 1 | X | X | X | 0 | X | X | CHANNEL #2 SELECTED |
| 0 | X | X | X | X | X | X | X | CHANNEL 3 / #3 DISABLED |
| 1 | X | X | X | 1 | X | X | X | CHANNEL 3 SELECTED |
| 1 | X | X | X | 0 | X | X | X | CHANNEL #3 SELECTED |
| 0 | 0 | 0 | 0 | 0 | 0 | 0 | 0 | DEFAULT: NO CHANNEL SELECTED |

FIG. 6 ial busses.

DOUBLE DENSITY I2C SYSTEM

BACKGROUND

The present disclosure relates to the field of computing hardware, and specifically to inter-integrated circuit (I2C)-based hardware systems. Still more specifically, the present disclosure relates a system that includes a primary serial bus and a plurality of secondary serial busses, and means for coupling the primary serial bus to one or more secondary serial busses.

The I2C bus is an industry standard serial bus for interconnecting and transferring information between various integrated circuits or "chips" in a computer or other electronic system. The standard I2C bus includes two lines, an "SDA" line for transmitting start, address, data, control, acknowledge and stop information, and an "SCL" line that carries the clock.

SUMMARY

In one embodiment of the present disclosure, a system comprises an inter-integrated circuit (I2C) master device coupled to an I2C multiplexer via a master inter-integrated circuit (I2C) bus. A plurality of slave I2C busses emanating from the I2C multiplexer couple the I2C multiplexer to a plurality of I2C slave devices. Each of the slave I2C busses comprises a bidirectional serial data (SDA) line and bidirectional serial clock (SCL) line. Each of the slave I2C busses, which is coupled to two I2C slave devices, has a first channel and a second channel. The first channel puts bidirectional serial data on the bidirectional SDA line and clock signals on the bidirectional SCL line, and the second channel puts bidirectional serial data on the bidirectional SCL line and clock signals on the bidirectional SDA line. A channel selector, associated with the I2C multiplexer, selectively couples the I2C master device to one of the two I2C slave devices via the first channel or the second channel.

In one embodiment, a hardware description language (HDL) design structure is encoded on a machine-readable data storage medium. The HDL design structure comprising elements that, when processed in a computer-aided design system, generate a machine-executable representation of a system. The system comprises an inter-integrated circuit (I2C) master device coupled to a master I2C bus. An I2C multiplexer is coupled to the master I2C bus. A plurality of slave I2C busses couple the I2C multiplexer to a plurality of I2C slave devices. Each of the slave I2C busses comprises a serial data (SDA) line and serial clock (SCL) line. Each of the slave I2C busses, which is coupled to two I2C slave devices, has a first channel and a second channel. The first channel puts serial data on the SDA line and clock signals on the SCL line, and the second channel puts serial data on the SCL line and clock signals on the SDA line. A channel selector, associated with the I2C multiplexer, selectively couples the I2C master device to one of the two I2C slave devices via the first channel or the second channel.

In one embodiment, a hardware-implemented method selectively establishes a data communication session between an inter-integrated circuit (I2C) master device and a particular I2C slave device in a hardware system. An I2C multiplexer receives a data communication packet from a I2C master device via a master I2C bus. A channel selector in the I2C multiplexer selectively routes the data communication packet to one of two I2C slave devices via a first channel or a second channel. A plurality of I2C slave devices are coupled to the I2C multiplexer via a plurality of slave I2C busses. Each of the slave I2C busses, which is coupled to two I2C slave devices, comprises a serial data (SDA) line and serial clock (SCL) line, and each of the slave I2C busses has the first channel and the second channel. The first channel puts serial data on the SDA line and clock signals on the SCL line, and the second channel puts serial data on the SCL line and clock signals on the SDA line.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
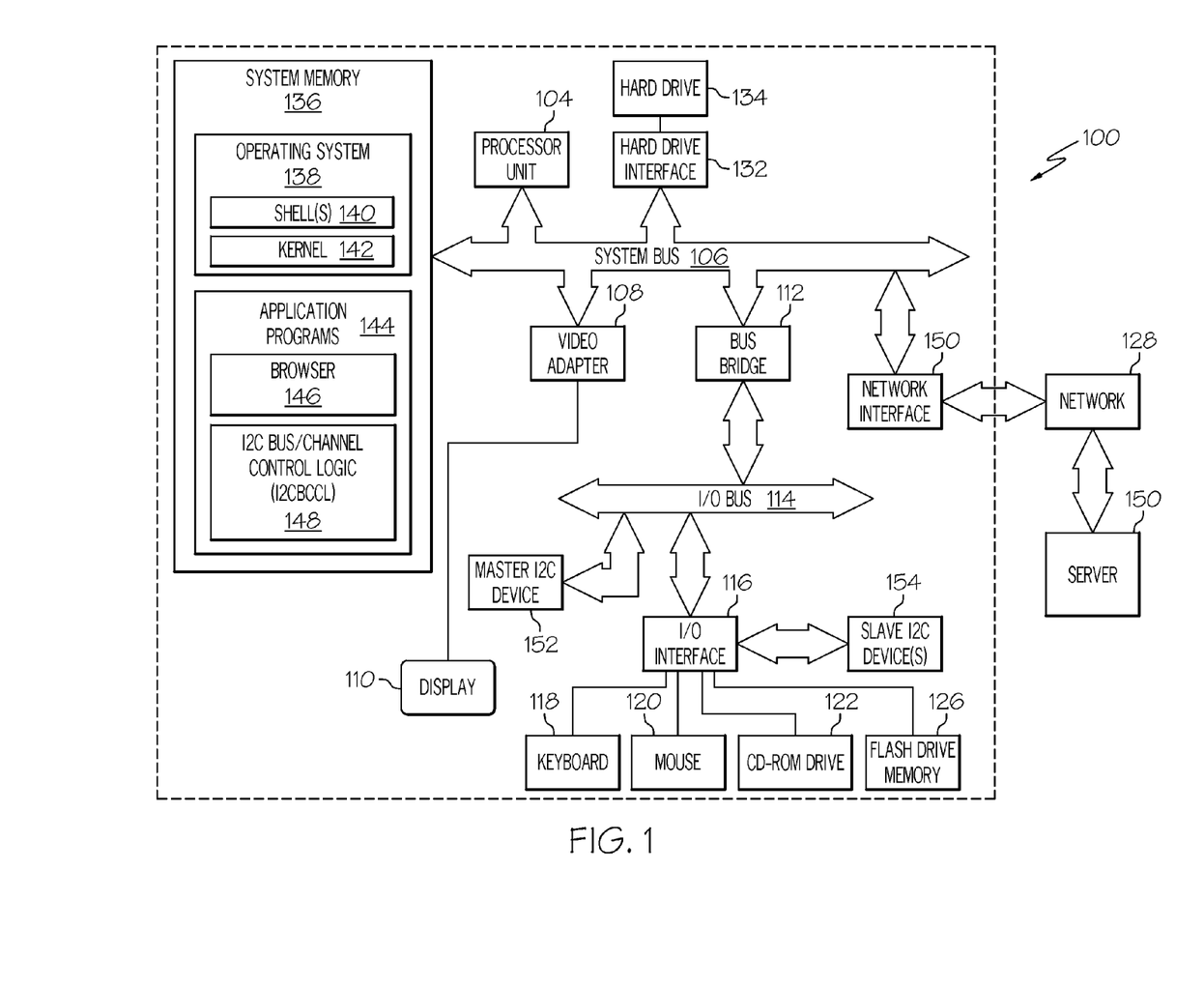
FIG. 1 depicts an exemplary physical computer in which the present invention may be implemented and/or utilized.

With reference now to FIG. 1, there is depicted a block diagram of an exemplary computer 100, with which and/or in which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include an I2C bus/channel control logic (I2CBCCL) 148, which, in one embodiment, executes the process described below in FIG. 6. In one embodiment, computer 100 is able to download I2CBCCL 148 from service provider server 150, preferably in an "on demand" basis.

Note that computer 100 also includes an I2C master device 152 and I2C slave device(s) 154. In one embodiment, assume that I/O bus 114 is an I2C bus, and I/O interface 116 is (or includes) an I2C multiplexer 202 shown in FIG. 2. For example, I2C master device 152 may be a field programmable gate array (FPGA) device that is designed to control traffic on an I2C bus, while I2C slave devices are low speed peripheral devices (e.g., analog-to-digital converters, digital-to-analog converters, microcontrollers, etc.) that need to be coupled to a motherboard of the computer 100.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
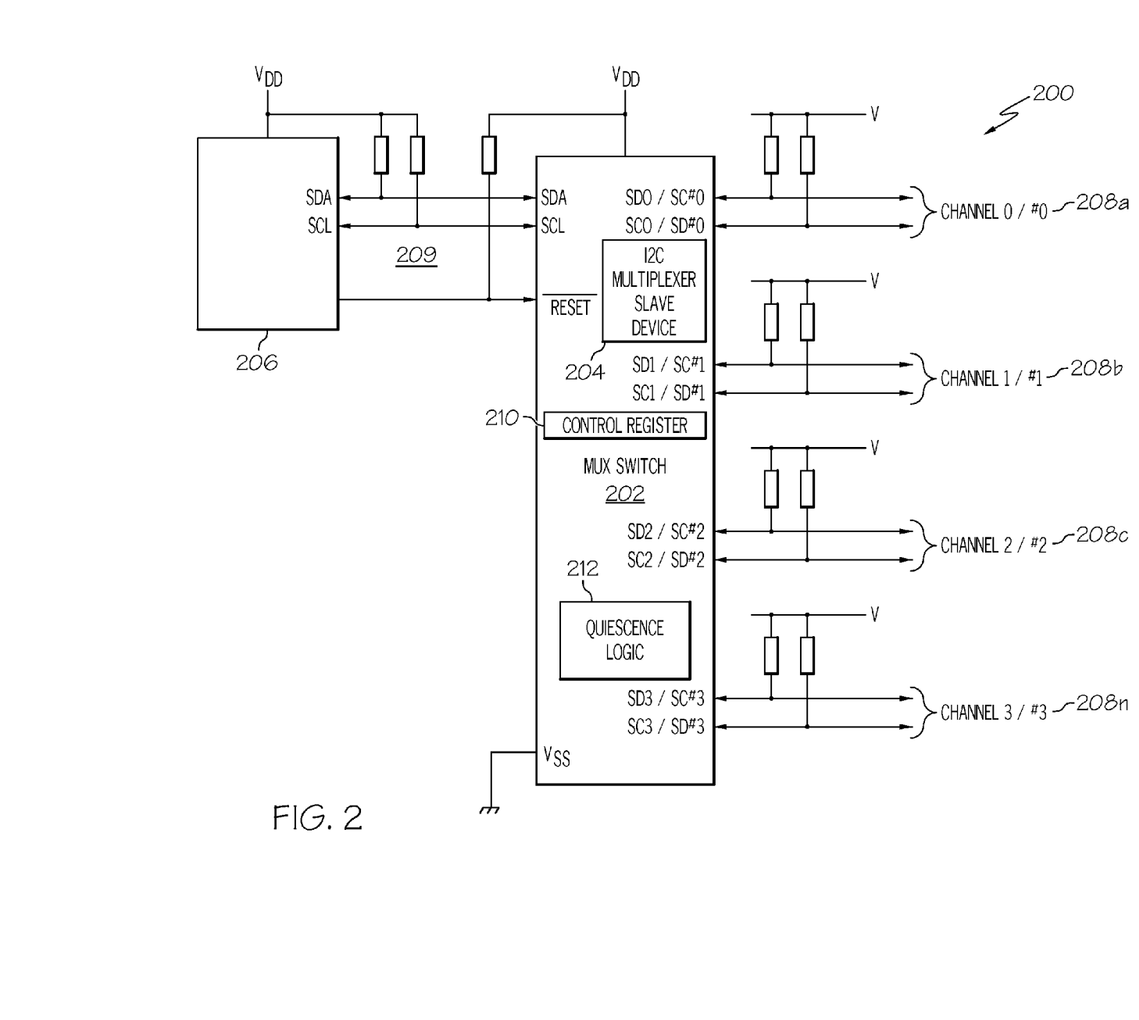
FIG. 2 illustrates an exemplary and novel 4-bus, 8-channel, double-density inter-integrated circuit (I2C) multiplexer in accordance with one embodiment of the present invention.

Referring now to FIG. 2, an exemplary I2C circuit 200, which includes an exemplary and novel 4-bus, 8-channel, double-density inter-integrated circuit (I2C) multiplexer ("mux/switch") 202 in accordance with one embodiment of the present invention, is presented. In one embodiment, the I2C multiplexer 202 device contains an I2C multiplexer slave device 204, which has a configurable address with which an I2C master device 206 can communicate via a master I2C bus 209. Following the successful acknowledgement of the slave address of the I2C multiplexer slave device 204, the I2C master device 206 (master-transmitter) sends a byte to the I2C multiplexer 202 identifying a particular I2C slave device (not shown) to which a communication session is intended. As described herein, this particular I2C slave device is coupled to the I2C multiplexer 202 via one of multiple slave I2C busses 208a-n (where "n" is an integer, and where "n" is a "4" to indicate, for exemplary purposes, that there are 4 slave I2C busses emanating from the I2C multiplexer 202 depicted in FIG. 2). This address byte of the particular I2C slave device is stored in a control register 210, and is used to determine which slave bus/channel is to be used to communicate with the particular I2C device.

Note that in one embodiment, the I2C master device 206 depicted in FIG. 2 may be a processor (e.g., part of processor unit 104 depicted in FIG. 1). In this embodiment, two separate I2C busses (i.e., two or more busses having the structure of the master I2C bus 209) come directly out of the processor (e.g., central processing unit—CPU). Each of these two I2C busses may be devoted to a group of memory modules (e.g., a group of 6 dual in-line memory modules—DIMMs). Even if multiple I2C busses come out of such a processor, the present system still saves pin space.

Figure 3:
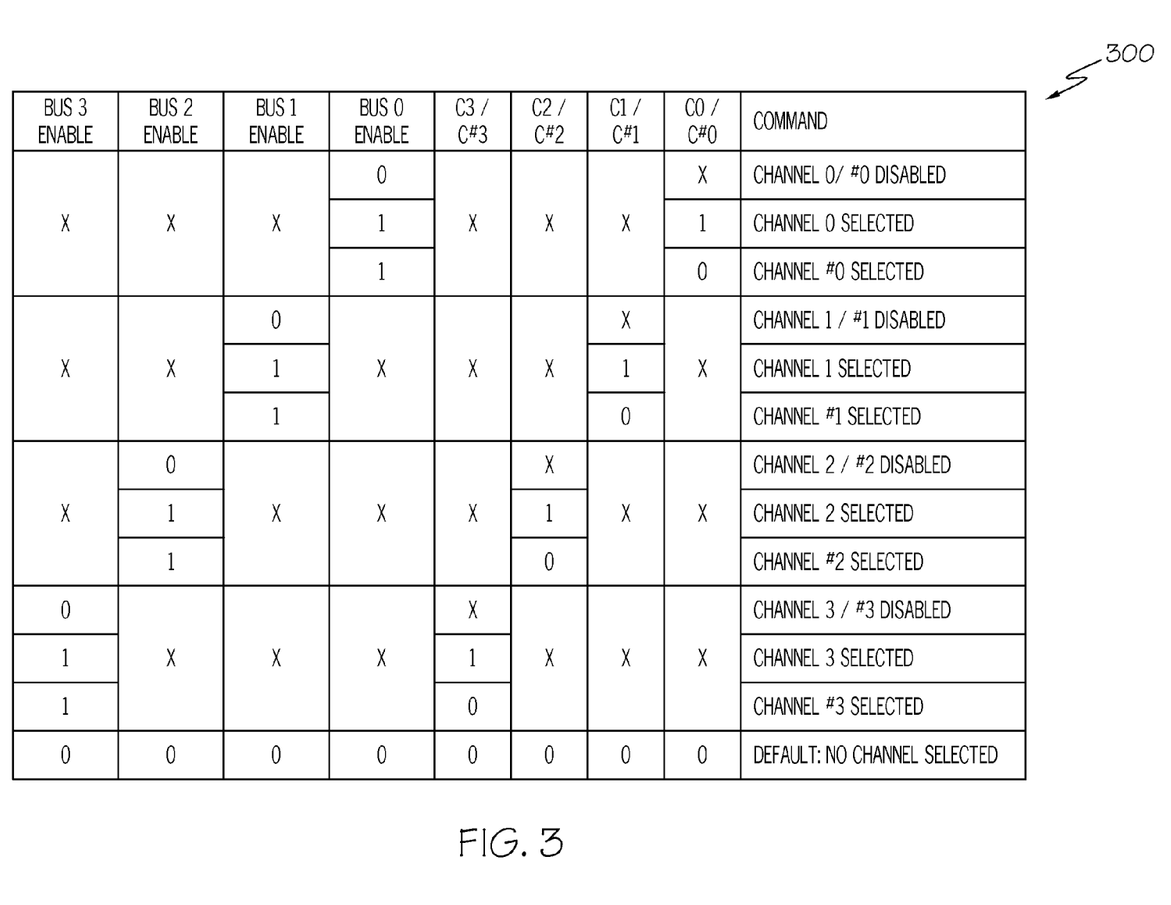
FIG. 3 depicts an exemplary control register table of data stored in a control register in the I2C multiplexer shown in FIG. 2.

For example, consider table 300 shown in FIG. 3, which shows a listing of which of the I2C slave devices are associated with a particular slave bus/channel. For example, if the byte is "XXX0XXXX" (where "X" is a "don't care" bit), then slave I2C bus 208a shown in FIG. 2 is disabled. Furthermore, this byte causes both channels (i.e., a first channel 0 which puts bidirectional serial data on the SDA line and clock signals on the SCL line of slave I2C bus 208, and a second channel #0 that puts bidirectional serial data on the SCL line and clock signals on the SDA line) to be disabled. However, if the byte is "XXX1XXX1", then channel 0 of slave I2C bus 208a is selected to communicate with a first I2C slave device that is on the slave I2C bus 208a. If the byte is "XXX1XXX0", then channel #0 is selected to communication with a second I2C slave device that shares the slave I2C bus 208a with the first I2C slave device. That is, one or several SCx/SDx downstream pairs, or channels, are selected by the contents of the control register 210. The contents of the control register 210 are written after the I2C slave device has been addressed by a communication message from the I2C master device 206. Note that two register bits are needed for each downstream bus (i.e., slave I2C busses 208a-n), in order to control which channel (X or #X) is selected and enabled. The 4 least significant bits (LSBs) of the control byte are used to determine which channel (X or #X) is to be selected, while the 4 most significant bits (MSBs) control the enablement of the bus that the selected channel resides on. Note that in one embodiment, several channels can be selected at the same time, whenever more than one "Bus Enable" bit is set to 1, but the X/#X channels are mutually exclusive, such that, out of the two, only one may be active at any given time.

Thus, the system/mechanism described herein allows the I2C multiplexer 202 to acquire double density by swapping the SDA and SCL lines (i.e., establishing channel X or channel #X) based upon the data byte written to the control register 210. Note that, in one embodiment, both the SDA line and the SCL line are bidirectional.

Figure 4:
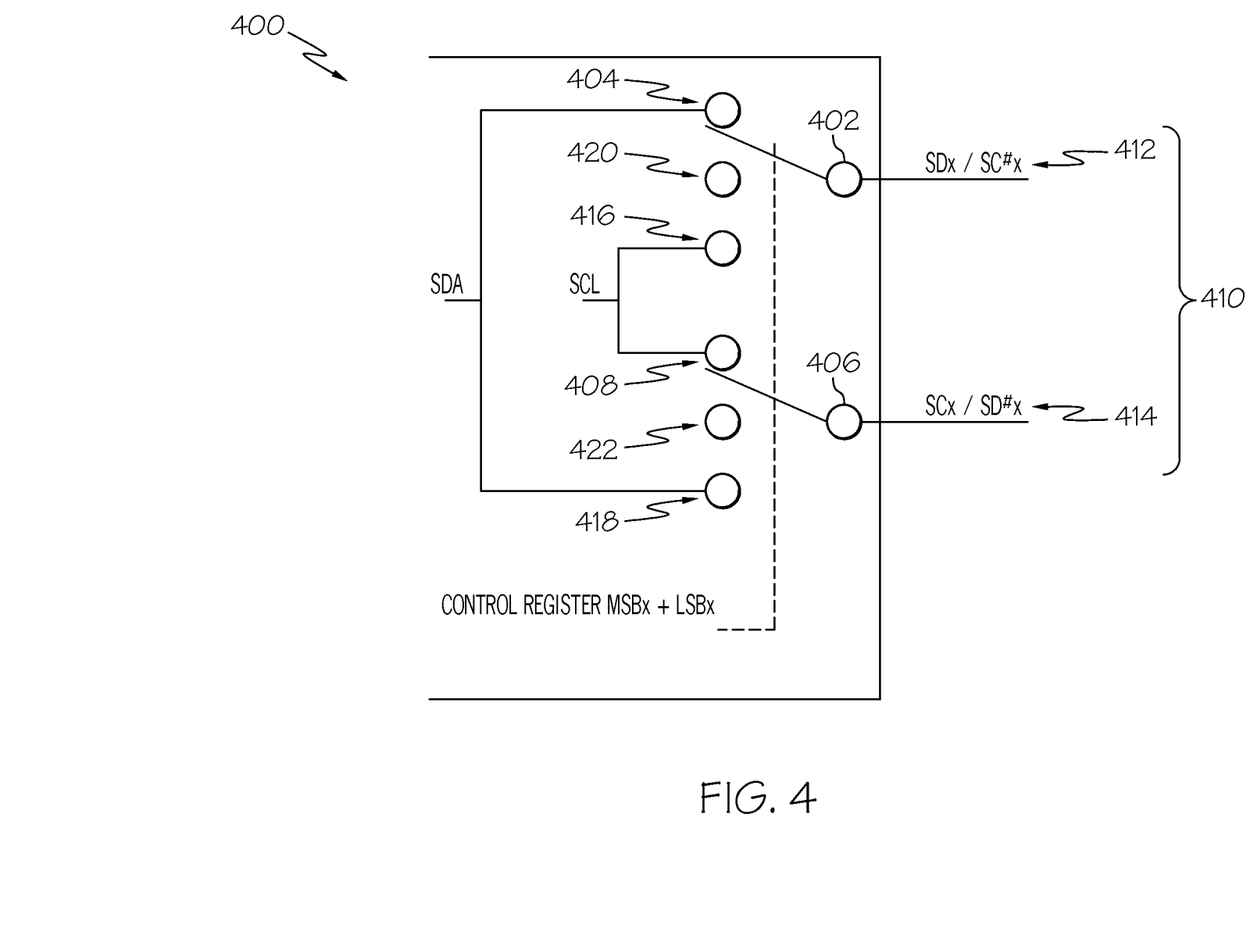
FIG. 4 illustrates an exemplary control switch, which is used to select a channel on a slave I2C bus emanating from the I2C multiplexer shown in FIG. 2.

As described herein, there are three possible states that a downstream bus (i.e., one of the slave I2C busses 208a-n) can be set to, based on the control byte stored in the control register 210: 1) Disabled; 2) Enabled with Channel X selected (i.e., upstream SDA/SCL connected to the channel using SDx/SCx); or 3) Enabled with Channel #X selected (upstream SDA/SCL connected to SD#x/SC#x, which is the reverse of the channel that uses SDx/SCx). For example, consider exemplary control switch 400 shown in FIG. 4, which can be viewed as a single pole-triple throw switch, and is used to select a channel on a slave I2C bus emanating from the I2C multiplexer 202 shown in FIG. 2. If the control byte in table 300 in FIG. 3 is "XXX1XXX1", then pole 402 is connected to pole 404, and pole 406 is connected to pole 408 (as shown). This causes the selection of a slave I2C bus 410, and configures that selected slave I2C bus 410 as one in which the SDA line 412 uses the SDx configuration to communicate data and the SCL line 414 uses the SCx configuration to transmit the clock signal. If the control byte in table 300 in FIG. 3 is "XXX1XXX0", then pole 402 is connected to pole 416 and pole 406 is connected to pole 418. This also causes the selection of the slave I2C bus 410, but now the SDA line and the SCL lines are used for opposite purposes. That is, this selection configures the slave I2C bus 410 to use the SC#x configuration of the SDA line 412 and the SD#x configuration of the SCL line 414 to communicate data. Finally, if the control byte in table 300 in FIG. 3 is "XXX0XXXX", then pole 402 is connected to pole 420 and pole 406 is connected to pole 422. This renders the slave I2C bus 410 as disabled, since there is no connection to either an SDA line pole or an SCL line pole.

Figure 5:
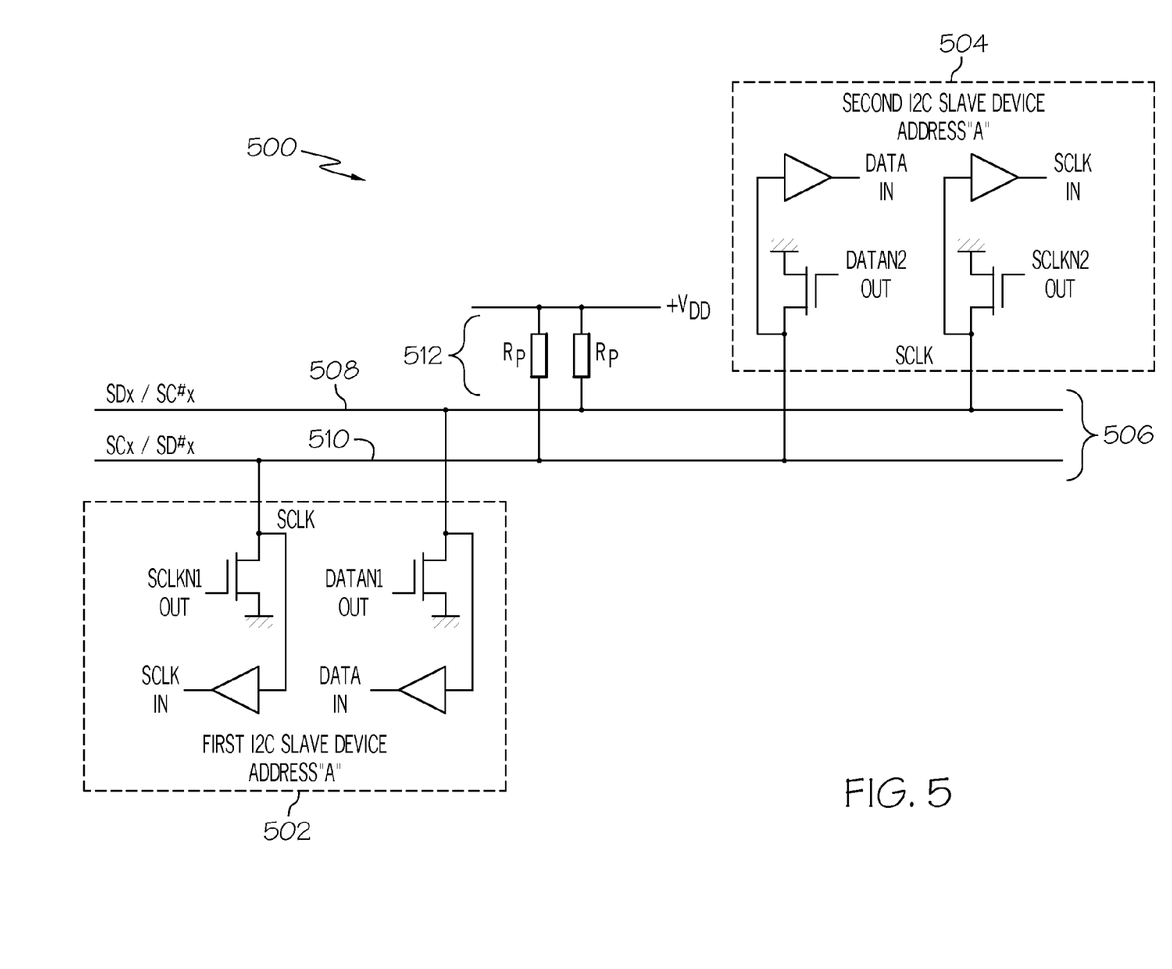
FIG. 5 depicts two exemplary I2C slave devices on a single I2C bus emanating from the I2C multiplexer shown in FIG. 2.

With reference now to FIG. 5, two exemplary I2C slave devices are depicted on a single I2C bus emanating from the I2C multiplexer 202 shown in FIG. 2 according to one embodiment of the present invention. Thus, when designing a printed circuit board (PCB), the PCB designer is instructed to hook two standard slave devices, which have the same address, to the same downstream bus, but with their SDA line and SCL line reversed. That is, consider circuit 500, in which a first I2C slave device 502 and a second I2C slave device 504 are both coupled to an I2C bus 506 (e.g., slave I2C bus 208a shown in FIG. 2 as emanating from the I2C multiplexer 202). Note that I2C bus 506 has an SDA line 508 and an SCL line 510, each of which are connected by pull-up resisters 512 to voltage +V$_{DD}$, and are selectively used to convey data on the SDA line 508 and clock signals on the SCL line 510 (SDx/SCx), or to convey clock signals on the SDA line 508 and data on the SCL line 510 (SC#x/SD#x). Thus, when a particular channel (on I2C bus 506) is selected by the procedure described above (using data from exemplary table 300 shown in FIG. 3), the I2C slave device (i.e., first I2C slave device 502) that is wired for channel X (i.e., data on the SDA line 508 and clock signals on the SCL line 510) responds, and the I2C slave device (i.e., second I2C slave device 504) that is wired for channel #X (clock signals on the SDA line 508 and data on the SCL line 510) sees a series of invalid bus conditions. When channel #X (clock signals on the SDA line 508 and data on the SCL line 510) is selected, the I2C slave device (i.e., second I2C slave device 504) that is wired for #X responds, and the device (i.e., first I2C slave device 502) that is wired for X (i.e., second I2C slave device 504) sees a series of invalid bus conditions.

To ensure that the downstream devices (i.e., first I2C slave device 502 and second I2C slave device 504) recover from the invalid bus conditions, a quiescence logic 212 in the I2C multiplexer 202 will stretch SCL on the upstream side, while it issues a start condition, 9 clocks, and stop condition on the downstream side. The I2C multiplexer 202 will then release the SCL line on the upstream side. When a particular channel emanating from the I2C multiplexer 202 is selected, that channel will become active after a STOP condition has been placed on the master I2C bus 209 shown in FIG. 2. This ensures that all SCx/SDx lines will be in a HIGH state when the channel is made active, so that no false conditions are generated at the time of connection. Thus, this SCL clock stretching allows each of the two I2C slave devices to reinitialize.

Note that the two I2C slave devices (502 and 504) shown in FIG. 5 both have a same I2C address "A". However, they can use that same address by utilizing the system/process described herein, since the I2C multiplexer 202 communicates with a particular I2C slave device based on 1) the I2C address for that particular I2C slave device, plus 2) the X or #X channel on the slave I2C bus to which that particular I2C slave device is connected.

Figure 6:
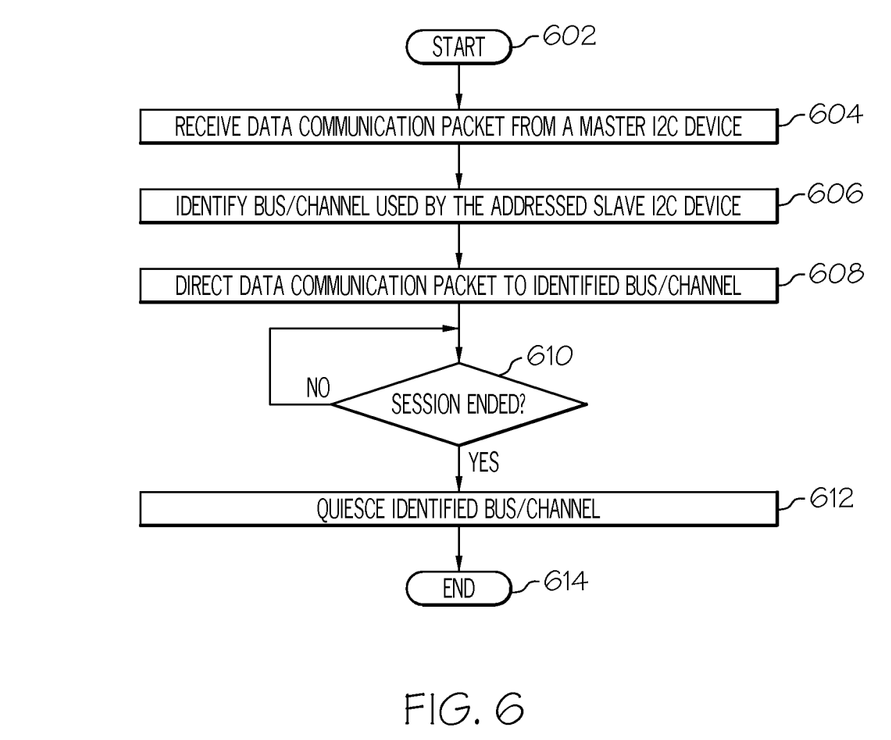
FIG. 6 is a high-level flow chart of one or more exemplary steps performed by hardware to route a communication packet from an I2C master device to a specific I2C slave device via the I2C multiplexer shown in FIG. 2.

With reference now to FIG. 6, a high-level flow chart of one or more exemplary steps performed by hardware to route a communication packet from an I2C master device to a specific I2C slave device via an I2C multiplexer is presented. After initiator block 602, an I2C multiplexer receives a data communication packet from an I2C master device via a master I2C bus (block 604). As described in block 606, a downstream I2C bus (e.g., one of the slave I2C busses 208a-n shown in FIG. 2) and a channel (X or #X) on that bus are identified as being appropriate for the communication packet, which is addressed to a particular I2C slave device. As described in block 608, a channel selector in the I2C multiplexer selectively routes the data communication packet to one of two I2C slave devices connected to the selected downstream I2C bus via a first channel or a second channel. As described herein, a plurality of slave I2C busses (e.g., slave I2C busses 208a-n shown in FIG. 2) are coupled to the I2C multiplexer via a plurality of slave I2C busses, wherein each of the slave I2C busses comprises a serial data (SDA) line and serial clock (SCL) line. As described herein, each of the slave I2C busses has a first channel and second channel, such that the first channel puts bidirectional serial data on the SDA line and clock signals on the SCL line, and the second channel puts bidirectional serial data on the SCL line and clock signals on the SDA line. Note further that each of the slave I2C busses is coupled to two I2C slave devices, which in one embodiment, have a same I2C address (see FIG. 5).

As described in query block 610, if the communication session (which is bidirectional between the I2C master device and the I2C slave device) ends, then a quiescence logic (e.g., element 212 in FIG. 2) pulls the slave I2C bus that was in use up to a predetermined voltage level in order to reset the two I2C slave devices (block 612). That is, the quiescence logic holds the voltage high on both the SDA line and SCL line for a predetermined amount of time, which causes the transistors and drivers within the I2C slave devices to reset, thus allowing them to send/receive future data transmissions on the slave I2C bus. The process ends at terminator block 614.

Figure 7:
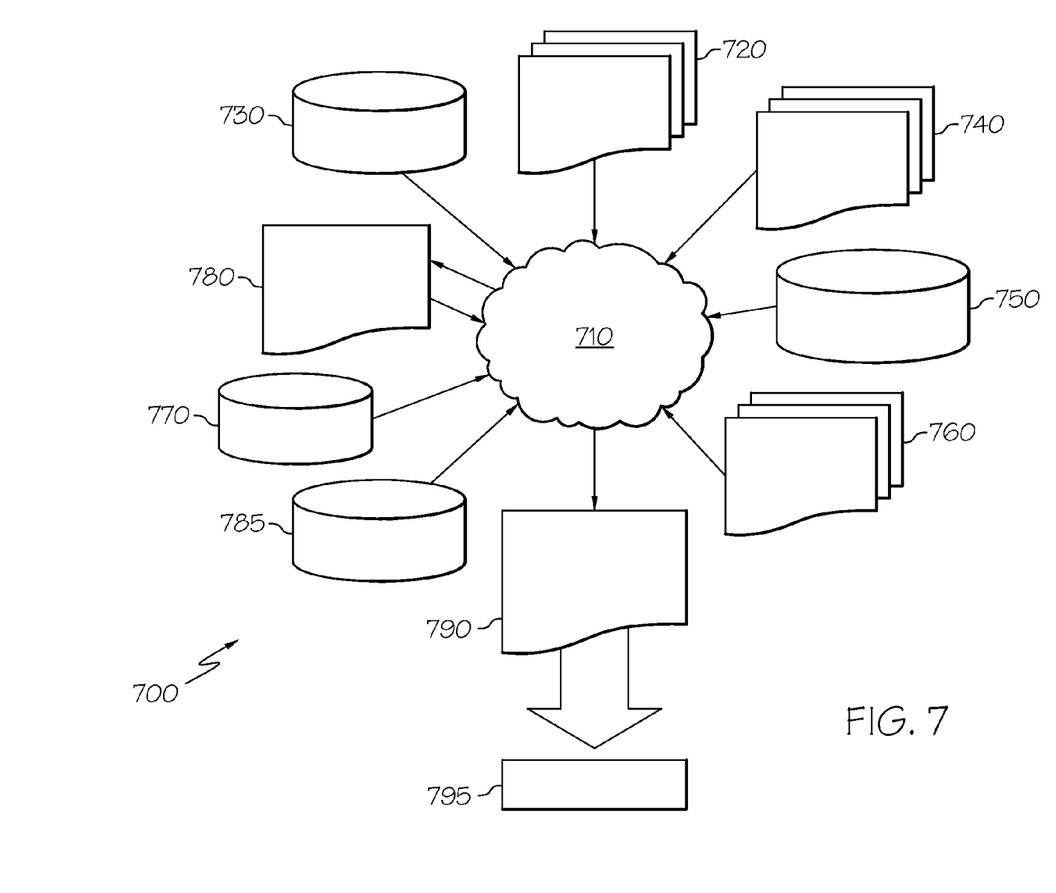
FIG. 7 is a flow diagram of a design process used in semiconductor design, manufacturing, and/or testing of the presently described exemplary I2C-based system.

With reference now to FIG. 7, there is depicted a block diagram of an exemplary design flow 700 used for example, in semiconductor IC logic design, simulation, testing, layout, and manufacturing. Design flow 700 includes processes, machines and/or mechanisms for processing design structures or devices to generate logically or otherwise functionally equivalent representations of the design structures and/or devices described above and shown in FIGS. 2-5. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown in FIGS. 2-5. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown in FIGS. 2-5 to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 50 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-5. In one embodiment, design structure 790 may comprise a compiled, executable HDL simulation model that functionally simulates the devices shown in FIGS. 2-5.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2-5. Design structure 790 may then proceed to a stage 795 where, for example, design structure 790: proceeds to tape-out, is released to manufacturing, is released to a mask house, is sent to another design house, is sent back to the customer, etc.

Note that for a single I2C device to act as a slave-transmitter, the address that the device responds to must be unique on the I2C bus to which it is connected. The I2C-bus committee coordinates allocation of I2C addresses, in which all devices of a certain type are given a fixed portion of address, and a programmable portion, which is usually chosen by discrete signals pulled high or low for each device. Thus there are limits to the number of like devices that can be connected to the same I2C bus, the logical addressing capability is depleted long before the electrical limitation of bus capacitance is reached. For example, a serial device that is defined for use on double double rate three dual inline memory modules (DDR3 DIMMS) can respond to 8 unique addresses, such that a maximum of 8 DIMM sockets can be connected to an I2C bus, while with 7-bit addressing it is logically possible to hook up over 100 unique devices to a bus, and capacitive limitations allow in the range of 40 devices, depending on layout. For server designs which implement a large number of DIMM sockets, standard I2C multiplexer devices must be used to physically separate these devices into separate busses, so they can be uniquely addressed. This can result in additional routing, space constraints, and cost as I2C multiplexers are added. The present invention described above thus addresses these routing/space/cost issues.

Note that in one embodiment of the present invention, the I2C multiplexer 202 is integrated into a central processing unit (CPU), which may be part of the processor unit 104 shown in FIG. 1. This CPU may also include the logic described for I2C master device 206. Thus, downstream input/outputs (I/Os) coming out of this combined package (i.e., a CPU containing the I2C multiplexer 202 and the I2C master device 206) are physical I2C busses. In this embodiment, the I2C multiplexer 202 and the I2C master device 206 are combined into the same logical entity. Access to the I2C multiplexer 202 in this embodiment can be from an I2C slave device or any other internal architecture for register access that the CPU provides. In this embodiment, the I2C multiplexer 202 logic is controlled (flipped/switched) using the control register 210 as described above. Similarly, in a manner described above, this embodiment allows the appearance of two I2C channels on the same physical pins of the CPU, thus doubling the density of the package (which includes the CPU).

As described herein, the present invention utilizes a novel I2C multiplexer, which swaps bus signals and additional programmed logic to allow up to twice the number of like devices to be placed on a single physical I2C downstream (slave) bus. The I2C slave downstream devices remain uniquely addressable, thereby doubling the device density for a given I2C multiplexer package. When applications call for many like devices to be used, such as high-end servers with a large number of dual inline memory module (DIMM) sockets, the advantage in space and routing provided by the present invention is clear.

By utilizing the process/system described herein, the addressing limitation of the I2C bus can be expanded by selectively reversing the I2C clock and data lines for specific devices. In this way, devices with identical addresses, which normally cannot be supported on a single bus, can be attached in the reversed mode.

Note further that the figures and tables described herein illustrate the invention as a 4-bus, 8-channel device. This is for illustrative purposes only; the invention can be scaled to any number of channels, and likewise the bits in the control register mechanism can be scaled and implemented in any arrangement selected by the architect of the system.

Note further that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A system comprising:

an inter-integrated circuit (I2C) master device coupled to a master I2C bus;

an I2C multiplexer coupled to the master I2C bus;

a plurality of slave I2C busses coupling the I2C multiplexer to a plurality of I2C slave devices, wherein each of the slave I2C busses comprises a bidirectional serial data (SDA) line and bidirectional serial clock (SCL) line, wherein each of the slave I2C busses has a first channel and a second channel, wherein the first channel puts bidirectional serial data on the bidirectional SDA line and clock signals on the bidirectional SCL line, wherein the second channel puts bidirectional serial data on the bidirectional SCL line and clock signals on the bidirectional SDA line, and wherein each of the slave I2C busses is coupled to two I2C slave devices; and a channel selector associated with the I2C multiplexer, wherein the channel selector selectively couples the I2C master device to one of the two I2C slave devices via the first channel or the second channel.

2. The system of claim 1, wherein the two I2C slave devices have a same I2C address.

3. The system of claim 1, further comprising:
a control register associated with the I2C multiplexer, wherein the control register contains a listing of which of the plurality of I2C slave devices is associated with a specific slave I2C bus and a specific channel.

4. The system of claim 1, further comprising:
a switching system within the I2C multiplexer, wherein the switching system selectively connects one of the two I2C slave devices to the first channel, the second channel, or neither channel.

5. The system of claim 4, wherein a communication session is established between the I2C master device and one of the two I2C slave devices via a particular slave I2C bus emanating from the I2C multiplexer, and wherein the system further comprises:
a quiescence logic within the I2C multiplexer, wherein the quiescence logic pulls the particular slave I2C bus to a predetermined voltage level in order to reset the two I2C slave devices.

6. A hardware description language (HDL) design structure encoded on a machine-readable data storage medium, said HDL design structure comprising elements that, when processed in a computer-aided design system, generate a machine-executable representation of a system, wherein said system comprises:
an inter-integrated circuit (I2C) master device coupled to a master I2C bus;
an I2C multiplexer coupled to the master I2C bus;
a plurality of slave I2C busses coupling the I2C multiplexer to a plurality of I2C slave devices, wherein each of the slave I2C busses comprises a serial data (SDA) line and serial clock (SCL) line, wherein each of the slave I2C busses has a first channel and a second channel, wherein the first channel puts bidirectional serial data on the SDA line and clock signals on the SCL line, wherein the second channel puts bidirectional serial data on the SCL line and clock signals on the SDA line, and wherein each of the slave I2C busses is coupled to two I2C slave devices; and
a channel selector associated with the I2C multiplexer, wherein the channel selector selectively couples the I2C master device to one of the two I2C slave devices via the first channel or the second channel.

7. The HDL design structure of claim 6, wherein the two slave devices have a same I2C address.

8. The HDL design structure of claim 6, wherein the system further comprises:
a control register associated with the I2C multiplexer, wherein the control register contains a listing of which of the plurality of I2C slave devices is associated with a specific slave I2C bus and a specific channel.

9. The HDL design structure of claim 6, wherein the system further comprises:

a switching system within the I2C multiplexer, wherein the switching system selectively connects one of the two I2C slave devices to the first channel, the second channel, or neither channel.

10. The HDL design structure of claim 9, wherein a communication session is established between the I2C master device and one of the two I2C slave devices via a particular slave I2C bus emanating from the I2C multiplexer, and wherein the system further comprises:
a quiescence logic within the I2C multiplexer, wherein the quiescence logic pulls the particular slave I2C bus to a predetermined voltage level in order to reset the two I2C slave devices.

11. A hardware-implemented method of selectively establishing a data communication session between an inter-integrated circuit (I2C) master device and a particular I2C slave device in a hardware system, the hardware-implemented method comprising:
an I2C multiplexer receiving a data communication packet from a I2C master device via a master I2C bus; and
a channel selector in the I2C multiplexer selectively routing the data communication packet to one of two I2C slave devices via a first channel or a second channel, wherein a plurality of slave I2C devices are coupled to the I2C multiplexer via a plurality of slave I2C busses, wherein each of the slave I2C busses comprises a serial data (SDA) line and serial clock (SCL) line, wherein each of the slave I2C busses has the first channel and the second channel, wherein the first channel puts bidirectional serial data on the SDA line and clock signals on the SCL line, wherein the second channel puts bidirectional serial data on the SCL line and clock signals on the SDA line, and wherein each of the slave I2C busses is coupled to two I2C slave devices.

12. The hardware-implemented method of claim 11, wherein the two I2C slave devices have a same I2C address.

13. The hardware-implemented method of claim 11, further comprising:
storing a listing of which of the plurality of I2C slave devices is associated with a specific slave I2C bus and a specific channel in a control register associated with the I2C multiplexer.

14. The hardware-implemented method of claim 11, further comprising:
a switching system, within the I2C multiplexer, selectively connecting one of the two I2C slave devices to the first channel, the second channel, or neither channel.

15. The hardware-implemented method of claim 14, wherein a communication session is established between the I2C master device and one of the two I2C slave devices via a particular slave I2C bus emanating from the I2C multiplexer, and wherein the hardware-implemented method further comprises:
a quiescence logic, within the I2C multiplexer, pulling the particular slave I2C bus to a predetermined voltage level in order to reset the two I2C slave devices.

* * * * *